UNITED STATES PATENT OFFICE.

JAMES O. HANDY AND ROBERT M. ISHAM, OF PITTSBURGH, PENNSYLVANIA, ASSIGNORS, BY MESNE ASSIGNMENTS, TO ALLEN S. DAVISON COMPANY, OF PITTSBURGH, PENNSYLVANIA, A CORPORATION OF PENNSYLVANIA.

REFRACTORY MATERIAL AND PROCESS OF MAKING SAME.

1,270,819.     Specification of Letters Patent.     Patented July 2, 1918.

No Drawing.     Application filed January 30, 1917. Serial No. 145,530.

*To all whom it may concern:*

Be it known that we, JAMES O. HANDY and ROBERT M. ISHAM, citizens of the United States, and residents of Pittsburgh, in the county of Allegheny and State of Pennsylvania, have invented certain new and useful Improvements in Refractory Materials and Processes of Making Same, of which the following is a specification.

This invention relates to refractory materials and processes of making the same; and it comprises as a new material a refractory composition having the composition of a dolomitic lime with the major portion but not all of its lime removed, sufficient of such lime being left to serve with the contained silica, etc., for fluxing purposes, such composition if necessary containing other added bonding materials such as silica and iron; and it also comprises a method of making such materials wherein dolomite or magnesian limestone is thoroughly burnt to free it of carbon dioxid and is thereafter submitted to a leaching or washing operation with cold water to remove the major portion but not all of the lime, washing being interrupted or discontinued when the extracted material shows from 3 to 10 per cent. of calcium oxid (calculated on the dried material) and wherein the material is thereafter recalcined at a high temperature to give a dead burnt product, bonding or coating materials being added, if desired, at the time of this recalcining operation; all as more fully hereinafter set forth and as claimed.

In the operation of basic open hearth furnaces the iron is melted in a furnace chamber where it is exposed to the action of oxygen and of lime for the purpose of eliminating the impurities of acid nature, such as silicon, phosphorus and sulfur, the silicon and phosphorus so oxidized uniting with lime and oxid of iron to form a freely fusible slag. In this operation the nature of the lining material of the furnace is of the greatest importance. It must have great mechanical strength and a good bond to resist the washing action of the iron and the manipulations incident to the process, and it must be as far as possible neutral or indifferent to the actions and reactions going on. It must not be of such a nature that it will flux either with the lime and oxid of iron on the one hand or with the acid impurities of the iron on the other. It must be refractory to a very great degree since the temperature of operation is high. So far the best materials found for this purpose are certain grades of magnesia made from magnesite imported mainly from Austria. Magnesia after calcination is a highly refractory material and is rather inactive chemically, such activity as it evinces being that of a base. Its silicates have a melting point so high that magnesia has very little tendency to flux away with silica. Magnesia in and of itself does not have much mechanical strength; it is so refractory that it cannot be caused to give a good bond in the furnace. It is for this reason that special grades of magnesia from magnesite are employed which contain more or less impurities fusible enough to give a bonding action without being sufficient in amount to detract from the refractory qualities of the magnesite. These special grades of somewhat impure magnesia being expensive and hard to obtain, particularly at present, many efforts have been made to produce substitutes. The best substitutes so far found are calcined magnesian limes or dolomites. Granulated hard burnt dolomitic lime is refractory enough, has but little action in the furnace and may by certain expedients be caused to give a bond when used for lining or patching a furnace. It is difficult, however, to prevent these dolomitic limes from absorbing moisture and carbonic acid when exposed to air in storage or in transit. Like pure magnesia they have little bonding action and must ordinarily be caused to bond by the addition of various other materials; as by mixing them with basic open hearth slag.

It has been found that there can be produced from these magnesian limestones or dolomites a refractory material which combines all the desirable qualities of magnesia stated above and which is of more constant composition and properties than the stated native magnesites while it does not deteriorate on shipment or storage as do most of the commercial materials made directly from dolomitic limestone.

To this end the dolomite or magnesian limestone is first calcined in any ordinary apparatus, such as a rotary kiln, a vertical kiln, etc. In this operation it is endeavored merely to secure a thorough calcination without carrying the temperature so high as to cause the material to be dead burnt. The calcined material is next treated with cold water in sufficient amount to slake and remove the bulk of the lime. While various chemicals may be added to the water to cause its solvent action on the lime to be more pronounced, such additions are expensive, are not necessary and do not give us as good a product as ordinary water. The water is best used as cold as possible.

In a practical embodiment of our process we may take a dolomite carrying, say, 45 per cent. magnesia and calcine it in a rotary kiln to obtain a granulated material of a size ranging between a pin-head and a pea. This calcined material, which should not be overburnt, is placed in a leaching vat or other suitable extracting apparatus and a slow current of cold water passed through until the residual material shows somewhere between 3 and 10 per cent. of lime after drying and recalcining; the precise proportion of lime allowed to remain being determined by the nature of the dolomite used and the properties desired in the finished material. When the leaching has been carried to the desired extent, the residual material is next dried in a rotary drier or other suitable form of drier. The dried material is next calcined to free it of water of hydration and carbon dioxid.

If the dolomite carries small amounts of silica and iron the material so produced is ready for direct use; and it may be simply crushed and used in the same way as imported impure magnesias. Frequently however, it is necessary to supplement somewhat the amount of silica and iron naturally present in obtaining a material which will bond well. The dolomites as a rule do not carry any great amount of combined silica, such silica as is present being largely in the form of sand (quartz) which is not very active for the present purposes. With such dolomites it is better to give a small addition of material carrying combined silica and iron, such as basic open hearth slag. The calcined material should carry between 3 and 6 per cent. of calcium oxid, although in some cases the amount of calcium oxid may go as high as 10 per cent. and 75 to 90 per cent. of magnesia. To secure a good bonding action it should also carry 4 to 8 per cent. of silica with 1 to 4 per cent. of oxid of iron. A few per cent. of alumina may also be present. If analysis shows a deficit in the silica and iron in the material it may be made up by the addition of a little basic open hearth slag, a substance which contains iron silicate. Other materials composed of or containing iron silicates may be employed instead. The proper amount of finely crushed or powdered basic open hearth slag may be mixed with the leached dolomitic lime prior to the second calcination. The effort is to produce a material which shall contain 85–88 per cent. of magnesia with the rest consisting of lime in the proportion of 3 to 10 per cent. and silica in the amount of 4 to 8 per cent. and a little iron, the lime, iron and silica being uniformly distributed through the calcined material so as to form a bond for all particles. With a less proportion of magnesia the material is not refractory enough; with a much greater proportion of magnesia it will not bond well. And it has been found that the presence of 3 to 10 per cent. of residual calcium oxid makes the bonding much better while this amount is not sufficient to cause the material to slake or alter in transit and storage.

In burning the second time the temperature should be carried high enough to produce a dead burnt material with the magnesia thoroughly shrunk and condensed. The material coming from the kiln may advantageously be crushed to about a 10-mesh size; but it may be delivered from the kiln in granules of larger size with advantage for many purposes. The material coming from the kiln may be crushed, molded into magnesite bricks, blocks or other shapes and reheated to secure bond. Or the granules may be used as they are. In molding into bricks and reheating the stated impurities act as effective bonding agents giving a hard, rigid and strong brick. For brick-making most of the material going into the molds should pass a 10-mesh sieve, although it is desirable to use a certain amount of somewhat coarser material in order to diminish shrinkage in burning and prevent after-cracking. In molding the crushed material into bricks it is desirable to use a little petroleum, tar or asphalt or other material as a temporary binder during the baking operation. This temporary binder chars and disappears during the baking and when the temperature becomes high enough the impurities exercise their bonding action. In the final calcination, whether this calcination be one that produces granulated material or be the final reheating to produce bricks, the temperature should reach from 1500 to 1550° C.

The purer the dolomite the more basic open hearth slag or another permanent bonding agent must be added.

What is claimed is:—

1. The process of making magnesia refractories which comprises calcining dolomite, extracting so as to remove the major portion but not all of the lime and reheating to produce refractory materials.

2. The process of making magnesia refractories which comprises calcining dolomite, extracting with cold water to remove the major portion but not all of the lime and reheating to produce refractory materials.

3. The process of making magnesia refractories which comprises calcining dolomite, extracting so as to remove the major portion but not all of the lime and reheating in the presence of small amounts of bonding material to produce refractory materials.

4. The process of making magnesia refractories which comprises calcining dolomite, extracting with cold water to remove the major portion but not all of the lime and reheating in the presence of small amounts of bonding material to produce refractory materials.

5. The process of making magnesia refractories which comprises calcining dolomite, extracting lime till the lime content is reduced to between 3 and 10 per cent. and reheating to produce refractory materials.

6. The process of making magnesia refractories which comprises calcining dolomite, extracting lime till the lime content is reduced to about 6 per cent. and reheating to produce refractory materials.

7. The process of making magnesia refractories which comprises calcining dolomite, extracting so as to remove the major portion but not all of the lime, shaping into bricks and reheating to produce refractory materials.

8. The process of making magnesia refractories which comprises calcining dolomite, extracting with cold water to remove the major portion but not all of the lime, shaping into bricks and reheating to produce refractory materials.

9. The process of making magnesia refractories which comprises calcining dolomite, extracting to remove the major portion but not all of the lime, shaping into bricks and reheating in the presence of small amounts of bonding material to produce refractory materials.

10. The process of making magnesia refractories which comprises calcining dolomite, extracting with cold water to remove the major portion but not all of the lime, shaping into bricks and reheating in the presence of small amounts of bonding material to produce refractory materials.

11. The process of making magnesia refractories which comprises calcining dolomite, extracting lime till the lime content is reduced to between 3 and 10 per cent., shaping into bricks and reheating to produce refractory materials.

12. The process of making magnesia refractories which comprises calcining dolomite, extracting lime till the lime content is reduced to about 6 per cent., shaping into bricks and reheating to produce refractory materials.

13. As a new material for basic furnace linings, a refractory comprising the constituents of a water leached dolomitic lime having most of the lime removed, said refractory containing between 75 and 90 per cent. magnesia, between 3 and 10 per cent. of lime and small amounts of silicia and iron.

14. As a new material for basic furnace linings, a refractory brick composed of bonded granules, such granules comprising the constituents of a water leached dolomitic lime having most of the lime removed, said refractory containing between 75 and 90 per cent. magnesia, between 3 and 10 per cent. of lime and small amounts of silica and iron.

In testimony whereof, we affix our signatures hereto.

JAMES O. HANDY.
ROB'T M. ISHAM.